(12) United States Patent
Yamaguchi et al.

(10) Patent No.: US 12,103,808 B2
(45) Date of Patent: Oct. 1, 2024

(54) PAPER FEEDING ROLL

(71) Applicant: Sumitomo Riko Company Limited, Aichi (JP)

(72) Inventors: Kazushi Yamaguchi, Aichi (JP); Atsuhiro Kawano, Aichi (JP); Takahisa Kose, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 211 days.

(21) Appl. No.: 17/859,002

(22) Filed: Jul. 7, 2022

(65) Prior Publication Data

US 2022/0340382 A1   Oct. 27, 2022

Related U.S. Application Data

(63) Continuation of application No. PCT/JP2021/003209, filed on Jan. 29, 2021.

(30) Foreign Application Priority Data

Jan. 31, 2020   (JP) ................. 2020-014499

(51) Int. Cl.
*B65H 5/06*   (2006.01)

(52) U.S. Cl.
CPC ........ *B65H 5/06* (2013.01); *B65H 2404/1115* (2013.01); *B65H 2404/50* (2013.01); *B65H 2801/06* (2013.01)

(58) Field of Classification Search
CPC .......... B65H 5/06; B65H 5/062; B65H 5/066; B65H 5/068

(Continued)

(56) References Cited

U.S. PATENT DOCUMENTS 3,804,011 A * 4/1974 Zimmer ................. B41F 15/426
                                                          101/120
4,316,733 A * 2/1982 Lawhon .................. C03B 18/06
                                                          65/182.4

(Continued)

FOREIGN PATENT DOCUMENTS

JP    S60107045    7/1985
JP    H0858999     3/1996

(Continued)

OTHER PUBLICATIONS

"Office Action of Japan Counterpart Application" with English translation thereof, issued on May 30, 2023, p. 1-p. 9.

(Continued)

*Primary Examiner* — Jason L Vaughan
(74) *Attorney, Agent, or Firm* — JCIPRNET

(57) ABSTRACT

Provided is a paper feeding roll that prevents paper transportation failures over a long time. A paper feeding roll 10 is provided with an axial body 12 and an elastic layer 14 formed on an outer periphery of the axial body 12. The circumferential surface of the elastic layer 14 has a plurality of projections 16 forming surface unevenness. Each projection 16 of the plurality of projections 16 is shaped such that a position X of a distal-end part preceding in an opposite direction to a paper feeding direction precedes, in the opposite direction to the paper feeding direction, a position Y of a base-end part preceding in the opposite direction to the paper feeding direction.

1 Claim, 6 Drawing Sheets

(58) Field of Classification Search
USPC .......................... 492/30, 31, 33, 34, 35, 36
See application file for complete search history.

(56) References Cited

U.S. PATENT DOCUMENTS

| | | | | |
|---|---|---|---|---|
| 4,546,964 | A * | 10/1985 | Linthout | B65H 9/166 |
| | | | | 271/251 |
| 6,626,427 | B2 * | 9/2003 | Choi | B65H 27/00 |
| | | | | 492/30 |
| 7,753,359 | B2 * | 7/2010 | Suzuki | B65H 3/0638 |
| | | | | 271/119 |
| 8,807,554 | B2 | 8/2014 | Mine et al. | |
| 9,202,723 | B2 * | 12/2015 | Withers | H01L 21/67046 |
| 10,261,460 | B2 | 4/2019 | Konishi et al. | |
| 2009/0209401 | A1 * | 8/2009 | Henderson | B23Q 3/002 |
| | | | | 492/30 |
| 2013/0133692 | A1 * | 5/2013 | Withers | A46D 1/0253 |
| | | | | 15/207.2 |
| 2020/0399084 | A1 | 12/2020 | Yamaguchi | |

FOREIGN PATENT DOCUMENTS

| | | |
|---|---|---|
| JP | H10273238 | 10/1998 |
| JP | 2014034428 | 2/2014 |
| JP | 2017065907 | 4/2017 |
| WO | 2019208296 | 10/2019 |

OTHER PUBLICATIONS

"International Search Report (Form PCT/ISA/210) of PCT/JP2021/003209," mailed on Mar. 2, 2021, with English translation thereof, pp. 1-4.

* cited by examiner (a)

(b)

(c)

(d)

PAPER FEEDING ROLL

CROSS-REFERENCE TO RELATED APPLICATION

The present application is a continuation of PCT/JP2021/003209, filed on Jan. 29, 2021, and is related to and claims priority from Japanese Patent Application No. 2020-014499, filed on Jan. 31, 2020. The entire contents of the aforementioned application are hereby incorporated by reference herein.

TECHNICAL FIELD

The disclosure relates to a paper feeding roll that is suitable for use in electrophotographic equipment such as copiers, printers, and facsimile machines that employ electrophotography.

RELATED ART

A paper feeding roll is formed in a cylindrical shape with use of an elastic material such as a rubber crosslinked product, and has a circumferential surface as the surface for contact with paper. Paper dust generated from paper may adhere to the circumferential surface of the paper feeding roll. Then, during repeated contact with paper, paper dust may accumulate on the circumferential surface of the paper feeding roll. As paper dust accumulates, the contact area of the circumferential surface for paper decreases, and the coefficient of friction of the contact surface for paper decreases. As a result, paper transportation failure may occur.

It is known to form the circumferential surface of the paper feeding roll with unevenness in order to prevent paper transportation failure (Patent Literature 1: Japanese Patent Laid-Open No. 2017-65907). For example, Patent Literature 1 describes a paper feeding roll that has a plurality of ridges and grooves formed in parallel to the axial direction of the paper feeding roll.

However, the conventional paper feeding roll is not yet sufficient in terms of maintaining a good coefficient of friction over a long period of time from the initial stage of use. In particular, some paper used in recent years is low-quality paper, and low-quality paper tends to generate paper dust and cause paper transportation failure relatively early.

The disclosure provides a paper feeding roll that prevents paper transportation failure over a long period of time.

SUMMARY

A paper feeding roll according to an embodiment of the disclosure is a paper feeding roll for an electrophotographic apparatus, which includes an axial body and an elastic layer formed on an outer periphery of the axial body. The paper feeding roll has a plurality of projections that form surface unevenness and are provided on a circumferential surface of the elastic layer, and each of the plurality of projections is shaped such that a position of a distal-end part preceding in an opposite direction to a paper feeding direction precedes, in the opposite direction to the paper feeding direction, a position of a base-end part preceding in the opposite direction to the paper feeding direction.

According to an embodiment of the disclosure, each of the plurality of projections has a linear inclination that precedes in the opposite direction to the paper feeding direction from a base end to a distal end on a side that precedes in the opposite direction to the paper feeding direction. According to an embodiment of the disclosure, the inclination angle with respect to the opposite direction to the paper feeding direction is an obtuse angle. According to an embodiment of the disclosure, the inclination angle with respect to the opposite direction to the paper feeding direction is 95° to 140°. According to an embodiment of the disclosure, each of the plurality of projections is composed of an oblique prism or an oblique frustum having a distal-end side that precedes a base-end side in the opposite direction to the paper feeding direction. According to an embodiment of the disclosure, the size of the area of the upper base is equal to or smaller than the size of the area of the lower base. According to an embodiment of the disclosure, the height of each of the plurality of projections is 30 μm to 500 μm. According to an embodiment of the disclosure, the plurality of projections are regularly arranged on the circumferential surface of the elastic layer.

For the paper feeding roll according to the disclosure, each of the plurality of projections provided on the circumferential surface of the elastic layer is shaped such that the position of the distal-end part preceding in the opposite direction to the paper feeding direction precedes, in the opposite direction to the paper feeding direction, the position of the base-end part preceding in the opposite direction to the paper feeding direction. Consequently, the projection that comes into contact with the paper during transportation of the paper tends to be collapsed in the opposite direction to the paper feeding direction, and the restoring force of the collapsed projection tends to act in the paper feeding direction to improve the transport force of the paper. As a result, paper transportation failure is suppressed over a long period of time.

Then, when the plurality of projections have the linear inclination that precedes in the opposite direction to the paper feeding direction from the base end to the distal end on the side that precedes in the opposite direction to the paper feeding direction, the projection that comes into contact with the paper during transportation of the paper tends to be collapsed in the opposite direction to the paper feeding direction. Then, when the inclination angle with respect to the opposite direction to the paper feeding direction is an obtuse angle, the projection that comes into contact with the paper during transportation of the paper tends to be collapsed in the opposite direction to the paper feeding direction. Then, when the inclination angle with respect to the opposite direction to the paper feeding direction is 95° to 140°, the projection that comes into contact with the paper during transportation of the paper tends to be collapsed in the opposite direction to the paper feeding direction, and the restoring force of the collapsed projection is easily increased.

Then, when each of the plurality of projections is composed of an oblique prism or an oblique frustum having the distal-end side that precedes the base-end side in the opposite direction to the paper feeding direction, the projection that comes into contact with the paper during transportation of the paper tends to be collapsed in the opposite direction to the paper feeding direction. At this time, when the size of the area of the upper base is equal to or smaller than the size of the area of the lower base, the restoring force of the collapsed projection is easily increased. Further, when the height of each of the plurality of projections is 30 μm to 500 μm, the projection that comes into contact with the paper during transportation of the paper tends to be collapsed in the opposite direction to the paper feeding direction, and the restoring force of the collapsed projection is easily increased.

Then, when the plurality of projections are regularly arranged on the circumferential surface of the elastic layer, a groove of recesses continuous in the arrangement direction is formed, and since this groove serves as a discharge path for the paper dust generated during transportation of the paper and easily discharges the paper dust to the outside of the roll, a decrease in the coefficient of friction due to accumulation of the paper dust is suppressed.

DESCRIPTION OF EMBODIMENTS

Figure 1:
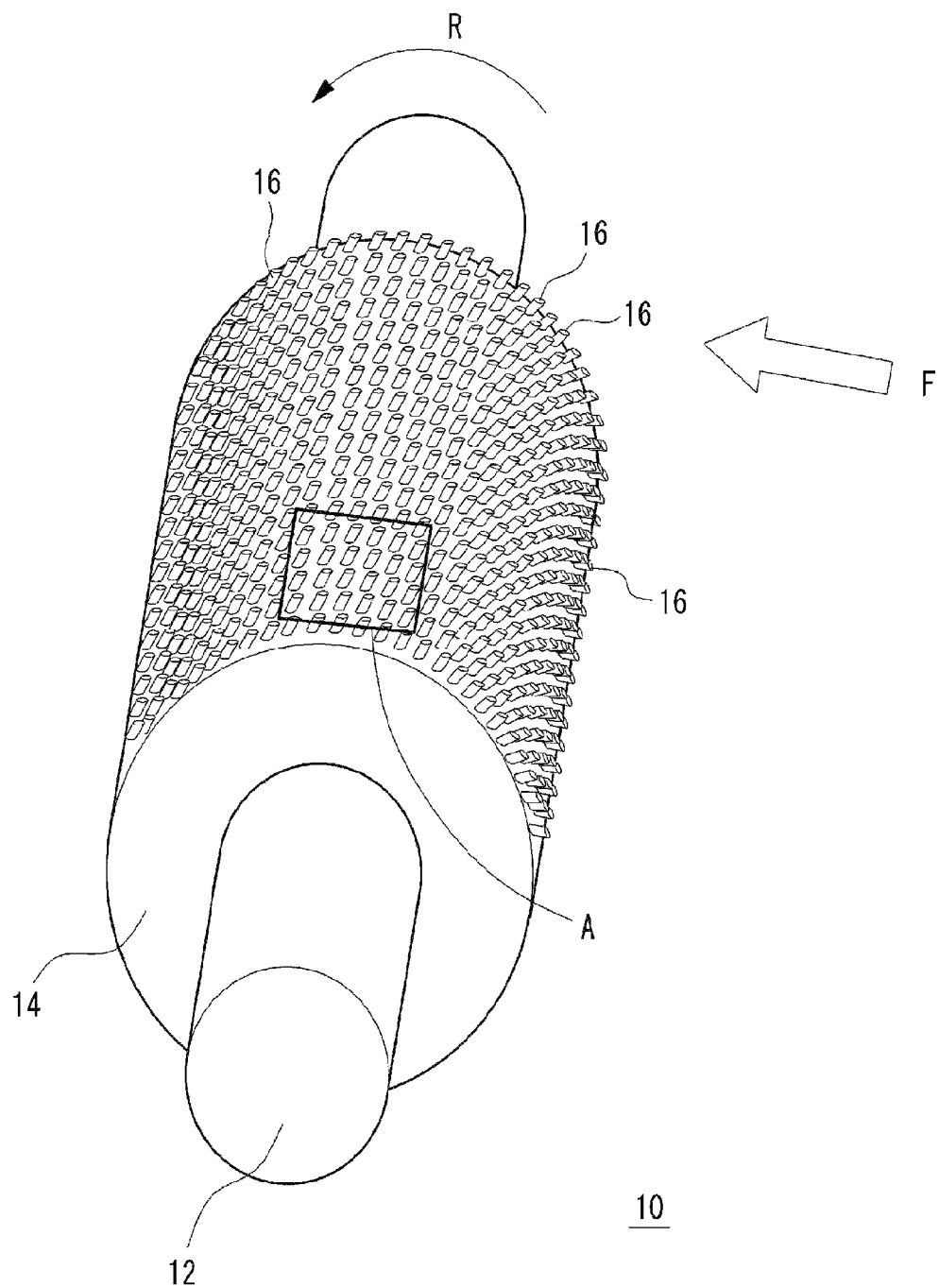
FIG. 1 is a schematic external view of the paper feeding roll according to an embodiment of the disclosure.
Figure 2:
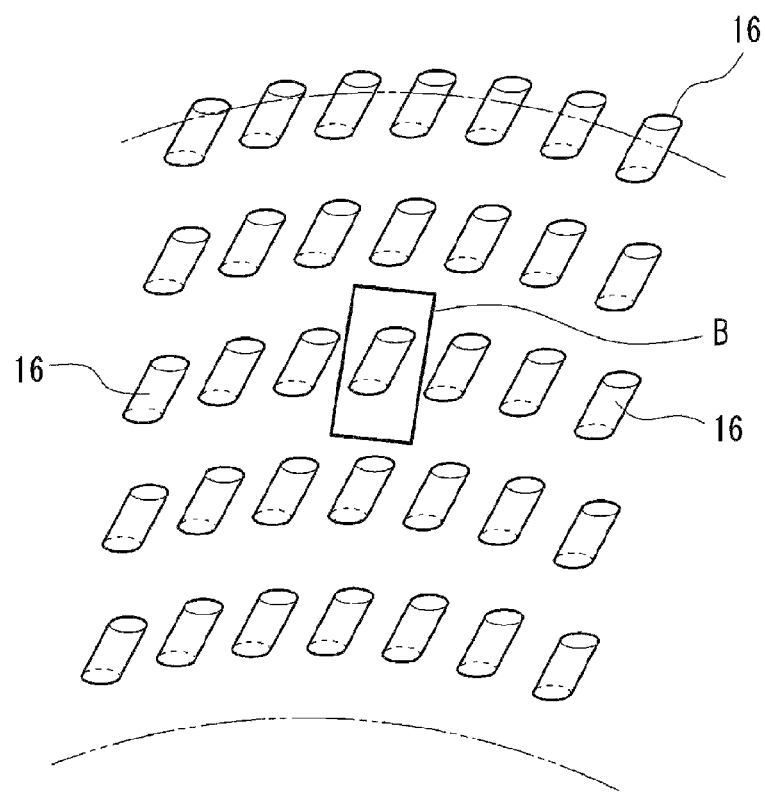
FIG. 2 is an enlarged view of the part A in FIG. 1.
Figure 3:
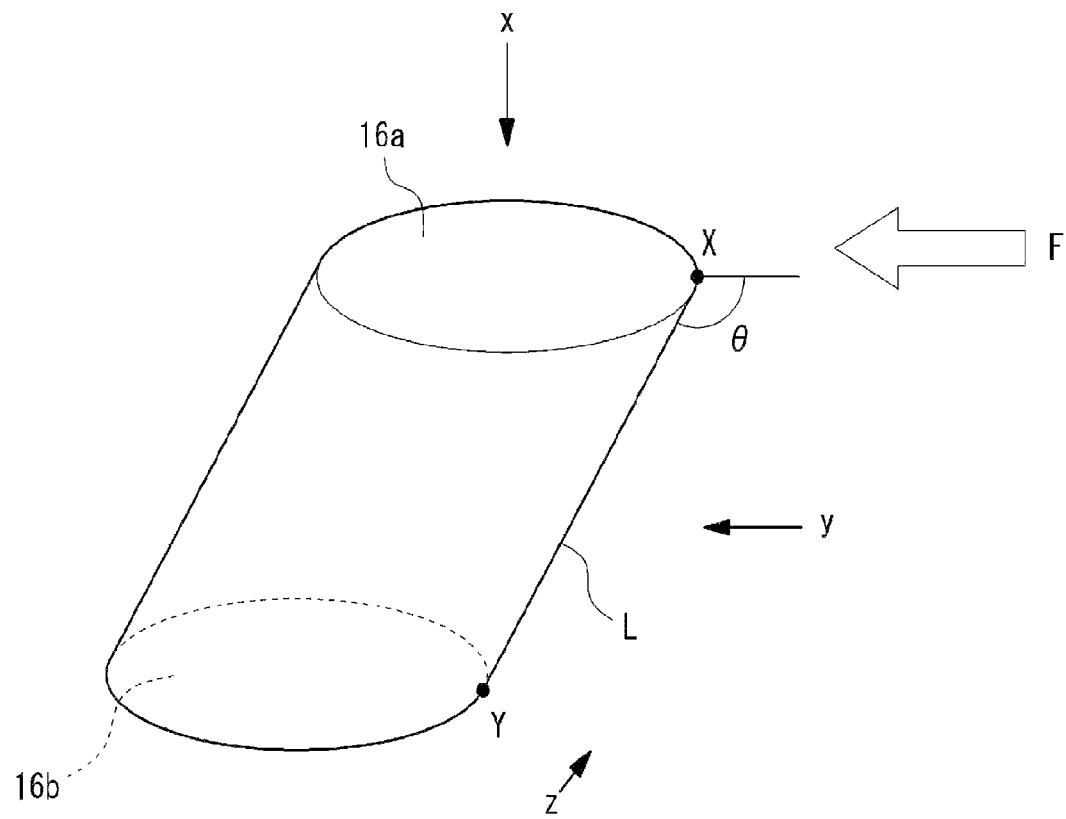
FIG. 3 is an enlarged view of the part B in FIG. 2.
Figure 4:
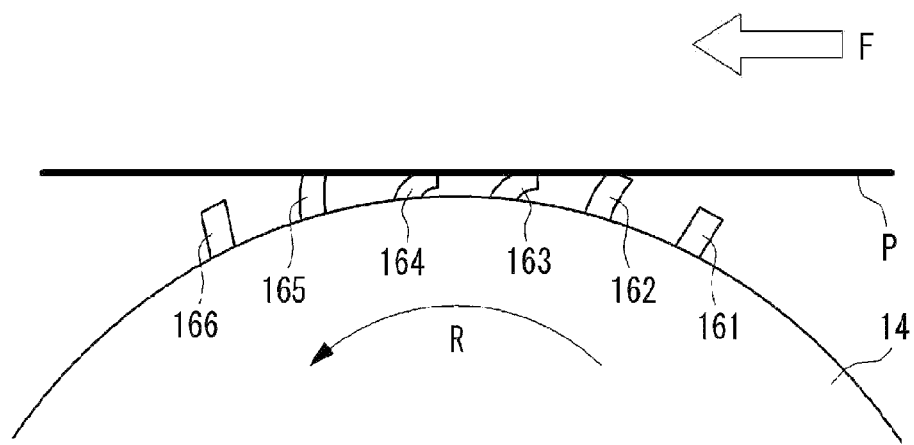
FIG. 4 is a schematic view illustrating the action and effect of the paper feeding roll according to an embodiment of the disclosure.

A paper feeding roll according to the disclosure (hereinafter, may be simply referred to as the paper feeding roll) will be described in detail. FIG. 1 is a schematic external view of the paper feeding roll according to an embodiment of the disclosure. FIG. 2 is an enlarged view of the part A in FIG. 1. FIG. 3 is an enlarged view of the part B in FIG. 2. FIG. 4 is a schematic view illustrating the action and effect of the paper feeding roll according to an embodiment of the disclosure. In FIG. 1, FIG. 3, and FIG. 4, the rotation direction of the paper feeding roll is defined as a direction R, and the paper feeding direction is defined as a direction F. Further, as shown in FIG. 3, the radial direction of the paper feeding roll is defined as a direction x, the circumferential direction of the paper feeding roll is defined as a direction y, and the axial direction of the paper feeding roll is defined as a direction z.

The paper feeding roll 10 according to an embodiment of the disclosure includes an axial body 12 and an elastic layer 14 formed on an outer periphery of the axial body 12. The elastic layer 14 is a layer (outermost layer) that appears on a surface of the paper feeding roll 10. The elastic layer 14 has a tubular shape (cylindrical shape). A plurality of projections 16 that form surface unevenness are provided on a circumferential surface of the elastic layer 14. The portion between the projections 16 is a recess lower than the projection 16, and the circumferential surface of the elastic layer 14 has unevenness due to the plurality of projections 16.

Each (projection 16) of the plurality of projections 16 is composed of an oblique cylinder whose distal-end side precedes a base-end side in an opposite direction to the paper feeding direction (located at a position advanced in the opposite direction to the paper feeding direction). The oblique cylinder is a cylinder whose bottom surface and side surface are not orthogonal to each other. A cylinder whose bottom surface and side surface are orthogonal to each other is a straight cylinder. The projection 16 composed of an oblique cylinder has a linear inclination L that precedes in the opposite direction to the paper feeding direction from the base end to the distal end on a side that precedes in the opposite direction to the paper feeding direction. An inclination angle θ with respect to the opposite direction to the paper feeding direction (an angle θ formed by a vector from the side of an upper base 16a toward the side of a lower base 16b of the projection 16 along the inclination L, and a vector in the opposite direction to the paper feeding direction) is an obtuse angle. The projection 16 composed of an oblique cylinder has the upper base 16a and the lower base 16b that are parallel to each other, and the upper base 16a and the lower base 16b have the same circular shape and the same area. The projection 16 composed of an oblique cylinder is shaped such that a position X of a distal-end part preceding in the opposite direction to the paper feeding direction precedes, in the opposite direction to the paper feeding direction, a position Y of a base-end part preceding in the opposite direction to the paper feeding direction.

In the paper feeding roll 10 having such a configuration, as shown in FIG. 4, when transporting paper P, the plurality of projections 16 come into contact with the paper P like the projection 162 from the state where the plurality of projections 16 are not in contact with the paper P like the projection 161 along with the rotation of the paper feeding roll 10. After being collapsed in the opposite direction to the paper feeding direction like the projection 163 due to the pressure from the paper P, the projections 16 try to restore in the paper feeding direction from the collapsed state like the projection 164. After the restoring force of the collapsed projections like the projection 165 acts in the paper feeding direction to feed the paper P in the paper feeding direction, the projections 16 are separated from the paper P like the projection 166. In this way, when transporting the paper P, the projections 16 that come into contact with the paper P tend to be collapsed in the opposite direction to the paper feeding direction, and the restoring force of the collapsed projections 16 tends to act in the paper feeding direction to improve the transport force of the paper P. As a result, transportation failure of the paper P is suppressed over a long period of time.

Since the plurality of projections 16 have the linear inclination L that precedes in the opposite direction to the paper feeding direction from the base end to the distal end on the side that precedes in the opposite direction to the paper feeding direction, the projections 16 tend to be collapsed in the opposite direction to the paper feeding direction by the pressure from the paper P like the projection 163. Further, since the inclination angle θ with respect to the opposite direction to the paper feeding direction is an obtuse angle, the projections 16 tend to be collapsed in the opposite direction to the paper feeding direction by the pressure from the paper P like the projection 163. In addition, since each of the plurality of projections 16 is composed of an oblique cylinder whose distal-end side precedes the base-end side in the opposite direction to the paper feeding direction, the projections 16 tend to be collapsed in the opposite direction to the paper feeding direction by the pressure from the paper P like the projection 163.

The inclination angle θ with respect to the opposite direction to the paper feeding direction is not particularly limited as long as the inclination angle θ is an obtuse angle, but the inclination angle θ is, for example, 95° to 140°. By setting the inclination angle θ to 95° or more, the projections 16 tend to be collapsed in the opposite direction to the paper feeding direction by the pressure from the paper P like the projection 163. Further, from this viewpoint, the inclination angle θ may be 100° or more. In addition, by setting the inclination angle θ to 140° or less, the projections 16 tend to restore in the paper feeding direction from the collapsed state like the projection 164. Further, from this viewpoint, the inclination angle θ may be 130° or less, and further the inclination angle θ may be 120° or less.

The height of the projection 16 is not particularly limited, but is, for example, in a range of 30 μm to 500 μm. By setting the height of the projection 16 to 30 μm or more, the projections 16 tend to be collapsed in the opposite direction to the paper feeding direction by the pressure from the paper P like the projection 163. From this viewpoint, the height of the projection 16 may be 50 μm or more, and further may be 100 μm or more. In addition, by setting the height of the projection 16 to 500 μm or less, the projections 16 tend to restore in the paper feeding direction from the collapsed state like the projection 164. Further, from this viewpoint, the height of the projection 16 may be 400 μm or less, and further may be 300 μm or less. The height of the projection 16 refers to the dimension of the projection 16 along the radial direction of the roll.

The diameter of the projection 16 (the length in the circumferential direction and the length in the axial direction of the paper feeding roll 10) composed of an oblique cylinder may be appropriately set according to the height of the projection 16. The diameter of the projection 16 can be, for example, in a range of 10 μm to 500 μm.

In FIG. 1, the plurality of projections 16 are uniformly distributed and arranged on the circumferential surface of the elastic layer 14. The plurality of projections 16 may be randomly arranged on the circumferential surface of the elastic layer 14, or may be arranged in an array.

In FIG. 1, the plurality of projections 16 are arranged in an array in the axial direction and the circumferential direction on the circumferential surface of the elastic layer 14. The portion between the rows of the projections 16 arrayed in the circumferential direction is a groove of continuous recesses. Further, the portion between the rows of the projections 16 arrayed in the axial direction is also a groove of continuous recesses. Since the groove of recesses continuous in the circumferential direction is formed in the rotation direction of the paper feeding roll 10, the paper dust moving from the projections 16 to the groove of recesses does not stay in the groove and is easily discharged from the groove to the outside of the roll as the roll rotates. That is, since this groove serves as a discharge path for the paper dust generated during transportation of the paper and easily discharges the paper dust to the outside of the roll, it is easy to suppress a decrease in the coefficient of friction due to accumulation of the paper dust.

Figure 5:
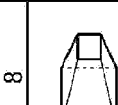
FIG. 5 contains diagrams showing examples of the shapes of a plurality of projections. (a) of FIG. 5 shows the shapes of patterns 1 to 8, and (b) of FIG. 5 shows the shapes of patterns 9 to 16.

The plurality of projections provided on the circumferential surface of the elastic layer 14 are not limited to the oblique cylindrical projection 16 shown in FIG. 3, and may have various shapes. FIG. 5 shows several examples of the shapes of the projections suitable to be used as the plurality of projections provided on the circumferential surface of the elastic layer 14. FIG. 5 shows the shapes of the projections with views of the projections from the radial direction (direction x) of the paper feeding roll, views of the projections from the circumferential direction (direction y) of the paper feeding roll, and views of the projections from the axial direction (direction z) of the paper feeding roll. (a) of FIG. 5 shows the shapes of patterns 1 to 8, and (b) of FIG. 5 shows the shapes of patterns 9 to 16.

The projection of pattern 1 is the oblique cylindrical projection 16 shown in FIG. 3. The projection of pattern 1 is composed of a perfect circular oblique cylinder whose upper base and lower base are of the same size. The projections of patterns 2 and 3 are composed of an elliptical oblique cylinder whose lower base is a perfect circle and whose upper base is an ellipse elongated in the circumferential direction or the axial direction of the paper feeding roll.

An oblique cylinder is a type of oblique prism. The oblique prism may be an oblique polygonal prism in addition to an oblique cylinder. The oblique polygonal prism is composed of a polygon whose bottom surface is triangular, quadrangular, pentagonal and so on. Like an oblique cylinder, the oblique polygonal prism is a prism whose bottom surface and side surface are not orthogonal to each other. The plurality of projections may be composed of oblique prisms other than the oblique cylinder.

The projection of pattern 5 is composed of an oblique quadrangular prism whose upper base and lower base are squares of the same size and whose side surface precedes in the opposite direction to the paper feeding direction. The projections of patterns 6 and 7 are composed of an oblique quadrangular prism whose lower base is a square, whose upper base is a quadrangle elongated in the circumferential direction or the axial direction of the paper feeding roll, and whose side surface precedes in the opposite direction to the paper feeding direction. The projection of pattern 9 is composed of an oblique quadrangular prism whose upper base and lower base are squares of the same size and whose side precedes in the opposite direction to the paper feeding direction. The projections of patterns 10 and 11 are composed of an oblique quadrangular prism whose lower base is a square, whose upper base is a quadrangle elongated in the circumferential direction or the axial direction of the paper feeding roll, and whose side precede in the opposite direction to the paper feeding direction. Furthermore, the oblique quadrangular prism constituting the plurality of projections may have an upper base and a lower base that are rectangles, rhombuses, parallelograms, trapezoids, etc. instead of squares.

The projection of pattern 13 is composed of an oblique triangular prism whose upper base and lower base are equilateral triangles of the same size and whose side precedes in the opposite direction to the paper feeding direction. The projections of patterns 14 and 15 are composed of an oblique triangular prism whose lower base is an equilateral triangle, whose upper base is a triangle elongated in the circumferential direction or the axial direction of the paper feeding roll, and whose side precedes in the opposite direction to the paper feeding direction. Furthermore, the oblique triangular prism constituting the plurality of projections may have an upper base and a lower base that are isosceles triangles, unequal triangles, etc. instead of equilateral triangles.

For the projection composed of an oblique prism, the distal-end side precedes the base-end side in the opposite direction to the paper feeding direction. Further, the projection composed of an oblique prism has a linear inclination that precedes in the opposite direction to the paper feeding direction from the base end to the distal end on the side that precedes in the opposite direction to the paper feeding direction. The inclination angle θ with respect to the opposite direction to the paper feeding direction is an obtuse angle. The upper base and the lower base of the projection composed of an oblique prism are parallel to each other. The projection composed of an oblique prism is shaped such that the position of the distal-end part preceding in the opposite direction to the paper feeding direction precedes, in the opposite direction to the paper feeding direction, the position of the base-end part preceding in the opposite direction to the paper feeding direction.

For example, the size of the area of the upper base of the projection composed of an oblique prism is equal to or smaller than the size of the area of the lower base. When the size of the area of the upper base is equal to or smaller than the size of the area of the lower base, it is easy to secure the force that the plurality of projections push the paper in the opposite direction to the paper feeding direction when transporting the paper. Among the projections composed of an oblique prism, the upper bases and the lower bases of the projections of patterns 1, 5, 9, and 13 have areas of the same size. Among the projections composed of an oblique prism, the areas of the upper bases of the projections of patterns 2, 3, 6, 7, 10, 11, 14, and 15 are smaller than the areas of the lower bases.

For oblique prisms whose upper base has a smaller area than the lower base as described above, the plurality of projections may be composed of an oblique frustum whose distal-end side precedes the base-end side in the opposite direction to the paper feeding direction. The oblique frustum is a truncated oblique cone that looks like the head of an oblique cone is cut out in a plane. An oblique cone is a cone that the foot of a perpendicular line drawn from the apex of the cone does not coincide with the center of gravity of the bottom surface. A cone that the foot of a perpendicular line drawn from the apex of the cone coincides with the center of gravity of the bottom surface is a straight cone. For the projection composed of an oblique frustum, the distal-end side precedes the base-end side in the opposite direction to the paper feeding direction. Further, the projection composed of an oblique frustum has a linear inclination that precedes in the opposite direction to the paper feeding direction from the base end to the distal end on the side that precedes in the opposite direction to the paper feeding direction. The inclination angle with respect to the opposite direction to the paper feeding direction is an obtuse angle. The upper base and the lower base of the projection composed of an oblique frustum may or may not be parallel to each other. The projection composed of an oblique frustum is shaped such that the position of the distal-end part preceding in the opposite direction to the paper feeding direction precedes, in the opposite direction to the paper feeding direction, the position of the base-end part preceding in the opposite direction to the paper feeding direction.

The oblique frustum constituting the plurality of projections may be an oblique truncated cone having circular upper base and lower base, an oblique polygonal frustum having polygonal upper base and lower base and so on. The polygon may be a triangle, a quadrangle, a pentagon, etc. The triangle may be an equilateral triangle, an isosceles triangle, an unequal triangle, etc. The quadrangle may be a square, a rectangle, a rhombus, a parallelogram, a trapezoid, etc.

The projection of pattern 4 is an oblique truncated cone whose upper base and lower base are perfect circles and whose curved surface precedes in the opposite direction to the paper feeding direction. The projection of pattern 8 is an oblique quadrangular frustum whose upper base and lower base are squares and whose plat surface precedes in the opposite direction to the paper feeding direction. The projection of pattern 12 is an oblique quadrangular frustum whose upper base and lower base are squares and whose side precedes in the opposite direction to the paper feeding direction. The projection of pattern 16 is an oblique triangular frustum whose upper base and lower base are equilateral triangles and whose side precedes in the opposite direction to the paper feeding direction.

The plurality of projections may have other shapes as long as the position of the distal-end part preceding in the opposite direction to the paper feeding direction precedes, in the opposite direction to the paper feeding direction, the position of the base-end part preceding in the opposite direction to the paper feeding direction. The other shapes may be an irregular shape, an elliptical prism, a fan-shaped prism, a D-shaped prism, a gear-shaped prism, a truncated prism whose prism head is cut into a slope or a curved surface, a truncated cone whose prism head is cut into a slope or a curved surface, etc. Further, the projection may have a shape that the top and bottom of the frustum are upside down (the size of the area of the upper base is larger than the size of the area of the lower base). Each upper base may have a polished surface. The polished surface can be formed by polishing each upper base.

The plurality of projections provided on the circumferential surface of the elastic layer 14 may be composed of only one type of the various projections, or may be configured by combining two or more types. For example, the circumferential surface of the elastic layer 14 of one paper feeding roll 10 may include projections shaped like oblique cylinders and projections shaped like oblique prisms. Furthermore, projections that have the same shape but different sizes and inclination angles may be combined. For example, the circumferential surface of the elastic layer 14 of one paper feeding roll 10 may include oblique cylindrical projections having an inclination angle of 95° and oblique cylindrical projections having an inclination angle of 100°. Further, the circumferential surface of the elastic layer 14 of one paper feeding roll 10 may include oblique cylindrical projections having an inclination angle of 95° and oblique prismatic projections having an inclination angle of 100°.

Figure 6:
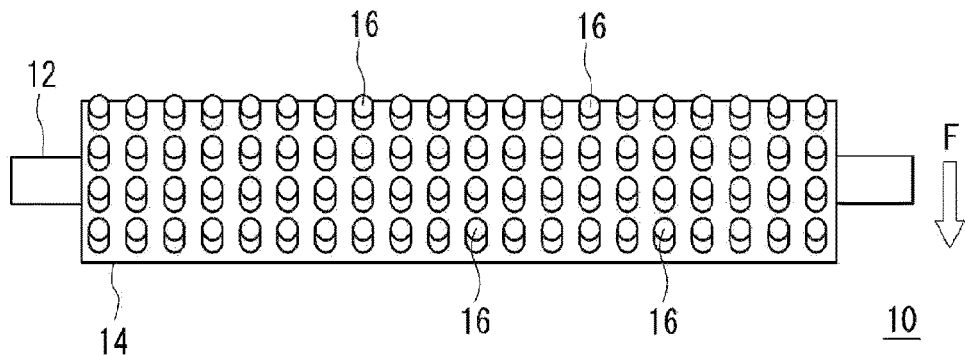
FIG. 6 contains diagrams showing the array forms of a plurality of projections. (a) of FIG. 6 is a diagram showing the array form of a plurality of projections of the paper feeding roll shown in FIG. 1. (b) to (d) of FIG. 6 are diagrams showing other array forms of a plurality of projections.
Figure 6:
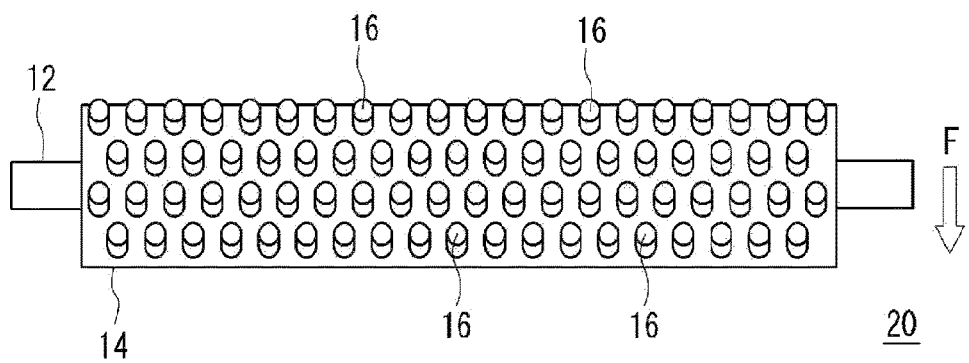
Figure 6:
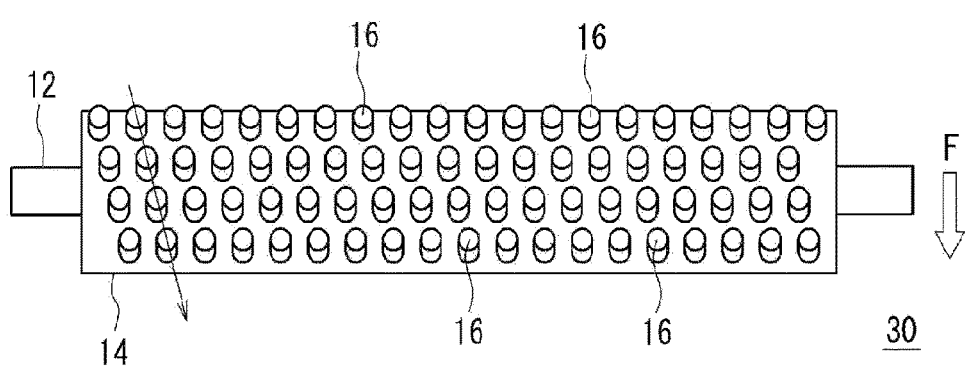
Figure 6:
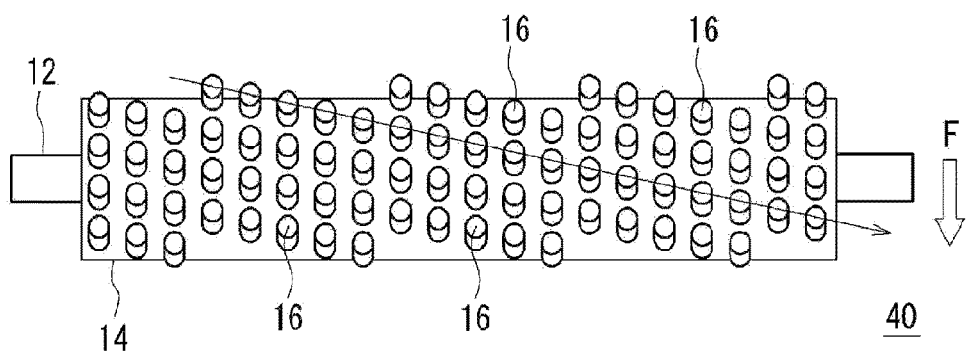

The plurality of projections provided on the circumferential surface of the elastic layer 14 may be arranged in an array form other than the array form shown in FIG. 1. (a) of FIG. 6 shows an array form of a plurality of projections of the paper feeding roll 10 shown in FIG. 1. (b) to (d) of FIG. 6 show other array forms of the plurality of projections.

On the circumferential surface of the elastic layer 14 of the paper feeding roll 10 in (a) of FIG. 6, the plurality of projections 16 are arranged to form an array in the axial direction and the circumferential direction. The plurality of projections 16 are uniformly arranged on the circumferential surface of the elastic layer 14. Therefore, the contact with the paper during transportation of the paper is uniform.

On the circumferential surface of the elastic layer 14 of the paper feeding roll 20 in (b) of FIG. 6, the plurality of projections 16 are arranged in a staggered manner. Specifically, the projection 16 of the second row is arranged between the projections 16 of the first row, the projection 16 of the third row is arranged between the projections 16 of the second row, the projection 16 of the fourth row is arranged between the projections 16 of the third row, and the projections 16 are arranged alternately. On the circumferential surface of the elastic layer 14 of the paper feeding roll 20 in (b) of FIG. 6, the plurality of projections 16 are uniformly arranged. Therefore, the contact with the paper during transportation of the paper is uniform.

On the circumferential surface of the elastic layer 14 of the paper feeding roll 30 in (c) of FIG. 6, the projections 16 are arranged along a direction (an oblique direction close to the circumferential direction) at a predetermined angle exceeding 45° with respect to the axial direction. On the circumferential surface of the elastic layer 14 of the paper feeding roll 30 in (c) of FIG. 6, a plurality of rows of projections 16 orbiting in the direction at the predetermined angle are arranged (not spiral). For the paper feeding roll 30 of (c) of FIG. 6, a groove of recesses is formed between the rows of the projections 16 in the direction at the predetermined angle exceeding 45° with respect to the axial direction (an oblique direction close to the circumferential direction). Therefore, like the groove of recesses continuous in the circumferential direction in (a) of FIG. 6, the paper dust moving from the projections 16 to the groove of recesses does not stay in the groove and is easily discharged from the groove to the outside of the roll as the roll rotates. That is, since this groove serves as a discharge path for the paper dust generated during transportation of the paper and easily discharges the paper dust to the outside of the roll, it is easy to suppress a decrease in the coefficient of friction due to accumulation of the paper dust.

On the circumferential surface of the elastic layer 14 of the paper feeding roll 40 in (d) of FIG. 6, the projections 16 are arranged along a direction (an oblique direction close to the axial direction) at a predetermined angle of less than 45° with respect to the axial direction (the direction of the arrow). On the paper feeding roll 40 of (d) of FIG. 6, a plurality of rows of projections 16 are arranged in the direction at the predetermined angle. For the paper feeding roll 40 of (d) of FIG. 6, a groove of recesses is formed between the rows of the projections 16 in the direction (an oblique direction close to the axial direction) at the predetermined angle of less than 45° with respect to the axial direction. Therefore, the paper dust generated during transportation of the paper easily moves from the projections 16 to the groove of recesses on the roll surface and does not easily stay and stick to the portion contacting the paper, and it is easy to suppress a decrease in the coefficient of friction resulting therefrom.

Next, a material structure of the paper feeding roll according to the disclosure will be described.

The material of the axial body 12 may include synthetic resin such as polyacetal (POM), acrylonitrile butadiene styrene copolymer (ABS), polycarbonate, and nylon or metal materials such as iron, stainless steel, and aluminum. The axial body 12a may be formed hollow or solid.

The elastic layer 14 is formed of an elastic material such as a rubber crosslinked product. The material is not particularly limited as long as the material is a rubber-like elastic material. For example, known rubber materials such as urethane rubber, hydrin rubber, and silicone rubber can be used.

The elastic layer 14 may or may not have conductivity or semi-conductivity. The volume resistivity of the elastic layer 14 having conductivity or semi-conductivity is in the ranges of $10^2$ to $10^{10}$ Ω·cm, $10^3$ to $10^9$ Ω·cm, $10^4$ to $10^8$ Ω·cm and so on. When the elastic layer 14 has conductivity or semi-conductivity, it is easy to suppress the residual charge on the surface of the elastic layer 14 to a low level to suppress adhesion of paper dust.

The elastic layer 14 may contain a conductive agent from the viewpoint of reducing electrical resistance. The conductive agent may be an electronic conductive agent and an ionic conductive agent. The electronic conductive agent may be carbon black, graphite, c-$TiO_2$, c-$ZnO$, c-$SnO_2$ (c-means conductivity), etc. The ionic conductive agent may be a quaternary ammonium salt, a borate, a surfactant, etc.

Various additives may be appropriately added to the elastic layer 14 as needed. The additives may include lubricants, vulcanization accelerators, anti-aging agents, light stabilizers, viscosity modifiers, processing aids, flame retardants, plasticizers, fillers, dispersants, defoamers, pigments, mold release agents, etc.

The thickness of the elastic layer 14 is not particularly limited, and may be appropriately set in a range of 0.1 mm to 10 mm.

The elastic layer 14 can be formed by molding with a molding die or the like using a rubber composition. For example, the elastic layer 14 can be formed on the outer periphery of the axial body 12 by installing the axial body 12 coaxially in the hollow portion of a roll molding die, injecting an uncrosslinked rubber composition, heating and curing (crosslinking) the rubber composition, and then demolding. A mold formed with recesses having shapes corresponding to the projections 16 on the inner peripheral surface thereof can be used as the molding die. The projections 16 of the elastic layer 14 can be formed, for example, by mold transfer using the molding die.

The recesses on the inner peripheral surface of the molding die can be formed by various recess forming methods such as electric discharge machining, etching, shot blasting, polishing, eutectoid plating or a combination thereof. In eutectoid plating, the recesses can be formed on the inner peripheral surface of the molding die by including uniform resin particles in a plating solution, depositing resin particles on the inner peripheral surface of the molding die together with plating metal, and removing the resin particles appearing on the plating surface.

Although the embodiment of the disclosure has been described above, the disclosure is not limited to the above embodiment, and various modifications can be made without departing from the spirit of the disclosure.

For example, in the above embodiment, the paper feeding roll 10 has a configuration including the axial body 12 and the elastic layer 14 formed on the outer periphery of the axial body 12, and the outermost layer is the elastic layer 14. However, a surface layer may be provided on the outer side of the elastic layer 14. In this case, the surface layer becomes the outermost layer, and the elastic layer 14 is arranged on the inner side the surface layer. The projections 16 may be formed on the circumferential surface of the elastic layer 14, and the surface layer may be formed with a thickness that ensures the surface unevenness brought by the plurality of projections 16. Furthermore, instead of forming the surface layer, a surface modification treatment may be applied.

EXAMPLES

Hereinafter, the disclosure will be described in detail with reference to the examples and comparative examples.
(Manufacture of the Paper Feeding Roll)

An elastic layer (thickness 3 mm) of a urethane rubber composition was formed on the outer periphery of a core material (φ6, made of SUS304) by using a cylindrical molding die having a plurality of predetermined recesses on the inner peripheral surface. As a result, a paper feeding roll having a plurality of predetermined projections on the circumferential surface of the elastic layer was obtained. The projection shape is each pattern shown in FIG. 5. As shown in (a) of FIG. 6, the plurality of projections were arranged to form an array in the roll axial direction and the roll circumferential direction on the circumferential surface of the elastic layer. The length of the upper base in the roll circumferential direction, the length of the upper base in the roll axial direction, the length of the lower base in the roll circumferential direction, the length of the lower base in the roll axial direction, the inclination angle (projection angle θ) with respect to the opposite direction to the paper feeding direction, and the height (projection height) of each projection are shown in Tables 1 to 4.

(Evaluation of Durability)

The paper feeding roll was incorporated into a commercially available copier equipped with an FRR type paper feed system to evaluate the paper feeding performance. Commercially available PPC paper was used as the paper, 500,000 sheets (500K sheets) were passed, and the number of times of paper jams caused by paper dust was measured. "A" indicates that the number of times of paper jams was 1 or less, "B" indicates that the number of times of paper jams was 2 or more and 5 or less, "C" indicates that the number of times of paper jams was 6 or more and 10 or less, and "D" indicates that the number of times of paper jams was 11. Moreover, when the paper jam occurred 11 times, the evaluation of durability was stopped.

TABLE 1

| | Example | | | | | | | | Comparative Example 1 |
|---|---|---|---|---|---|---|---|---|---|
| Projection shape | 1 | 2 | 3 | 4 | 5 | 6 | 7 | 8 | Straight cylinder |
| | Pattern 1 (oblique cylinder) | | | | | | | | |
| Length of upper base in circumferential direction (μm) | 100 | 100 | 100 | 100 | 100 | 100 | 100 | 100 | 100 |
| Length of upper base in axial direction (μm) | 100 | 100 | 100 | 100 | 100 | 100 | 100 | 100 | 100 |
| Length of lower base in circumferential direction (μm) | 100 | 100 | 100 | 100 | 100 | 100 | 100 | 100 | 100 |
| Length of lower base in axial direction (μm) | 100 | 100 | 100 | 100 | 100 | 100 | 100 | 100 | 100 |
| Projection angle θ (°) | 100 | 95 | 140 | 150 | 120 | 100 | 100 | 100 | 90 |
| Projection height (μm) | 200 | 200 | 200 | 200 | 20 | 30 | 500 | 600 | 200 |
| Durability | A | B | A | C | C | B | A | C | D |

TABLE 2

| | Example | | | | | | | | Comparative Example 2 Straight quadrangular prism |
|---|---|---|---|---|---|---|---|---|---|
| Projection shape | 9 | 10 | 11 | 12 | 13 | 14 | 15 | 16 | |
| | Pattern 5 (oblique quadrangular prism) | | | | | | | | |
| Length of upper base in circumferential direction (μm) | 100 | 100 | 100 | 100 | 100 | 100 | 100 | 100 | 100 |
| Length of upper base in axial direction (μm) | 100 | 100 | 100 | 100 | 100 | 100 | 100 | 100 | 100 |
| Length of lower base in circumferential direction (μm) | 100 | 100 | 100 | 100 | 100 | 100 | 100 | 100 | 100 |
| Length of lower base in axial direction (μm) | 100 | 100 | 100 | 100 | 100 | 100 | 100 | 100 | 100 |
| Projection angle θ (°) | 100 | 95 | 140 | 150 | 120 | 100 | 100 | 100 | 90 |
| Projection height (μm) | 200 | 200 | 200 | 200 | 20 | 30 | 500 | 600 | 200 |
| Durability | A | B | A | C | C | B | A | C | D |

TABLE 3

| | Example | | | Comparative Example 3 | Example | | | Comparative Example 4 |
|---|---|---|---|---|---|---|---|---|
| | 17 | 18 | 19 | | 20 | 21 | 22 | |
| Projection shape (pattern no.) | 2 | 3 | 4 | Straight truncated cone | 6 | 7 | 8 | Straight quadrangular frustum |
| Length of upper base in circumferential direction (μm) | 50 | 100 | 20 | 20 | 20 | 100 | 20 | 20 |
| Length of upper base in axial direction (μm) | 100 | 50 | 20 | 20 | 100 | 20 | 20 | 20 |
| Length of lower base in circumferential direction (μm) | 100 | 100 | 100 | 100 | 100 | 100 | 100 | 100 |
| Length of lower base in axial direction (μm) | 100 | 100 | 100 | 100 | 100 | 100 | 100 | 100 |
| Projection angle θ (°) | 100 | 100 | 100 | 80 | 100 | 100 | 100 | 80 |
| Projection height (μm) | 200 | 200 | 200 | 200 | 200 | 200 | 200 | 200 |
| Durability | B | B | B | D | B | B | B | D |

TABLE 4

| | Example | | | | | | | |
|---|---|---|---|---|---|---|---|---|
| | 23 | 24 | 25 | 26 | 27 | 28 | 29 | 30 |
| Projection shape (pattern no.) | 9 | 10 | 11 | 12 | 13 | 14 | 15 | 16 |
| Length of upper base in circumferential direction (μm) | 140 | 70 | 140 | 30 | 87 | 43 | 50 | 26 |
| Length of upper base in axial direction (μm) | 140 | 140 | 70 | 30 | 100 | 100 | 87 | 30 |
| Length of lower base in circumferential direction (μm) | 140 | 140 | 140 | 140 | 87 | 87 | 87 | 87 |
| Length of lower base in axial direction (μm) | 140 | 140 | 140 | 140 | 100 | 100 | 100 | 100 |
| Projection angle θ (°) | 100 | 100 | 100 | 100 | 100 | 100 | 100 | 100 |
| Projection height (μm) | 200 | 200 | 200 | 200 | 200 | 200 | 200 | 200 |
| Durability | B | B | B | B | B | B | B | B |

The projection of the elastic layer of each example is composed of an oblique prism (oblique cylinder, oblique quadrangular prism or oblique triangular prism) or an oblique frustum (oblique truncated cone, oblique quadrangular frustum or oblique triangular frustum). On the other hand, the projection of the elastic layer of each comparative example is composed of a straight prism (straight cylinder or straight quadrangular prism) or a straight frustum (straight truncated cone or straight quadrangular frustum). The projection of the elastic layer of each example is shaped such that the distal-end side precedes the base-end side in the opposite direction to the paper feeding direction, and the position of the distal-end part preceding in the opposite direction to the paper feeding direction precedes, in the opposite direction to the paper feeding direction, the position of the base-end part preceding in the opposite direction to the paper feeding direction. In contrast thereto, the projection of the elastic layer of each comparative example is shaped such that the position of the distal-end part preceding in the opposite direction to the paper feeding direction does not precede, in the opposite direction to the paper feeding direction, the position of the base-end part preceding in the opposite direction to the paper feeding direction. According to each example, paper transportation failure is suppressed even with pass of 500,000 sheets of paper, but according to each comparative example, paper jams often occur and paper transportation failure is not suppressed with pass of 500,000 sheets of paper. Accordingly, it can be seen that the projection of the elastic layer is shaped such that the position of the distal-end part preceding in the opposite direction to the paper feeding direction precedes, in the opposite direction to the paper feeding direction, the position of the base-end part preceding in the opposite direction to the paper feeding direction, which suppresses paper transportation failure over a long period of time.

Then, according to the comparison of examples 1 to 8 or the comparison of examples 9 to 16, when the inclination angle with respect to the opposite direction to the paper feeding direction is 95° to 140°, the effect of suppressing paper transportation failure is particularly excellent. Further, when the height of the projection is 30 μm to 500 μm, the effect of suppressing paper transportation failure is particularly excellent.

Although embodiments of the disclosure have been described above, the disclosure is not limited to the above embodiments in all aspects, and various modifications can be made without departing from the spirit of the disclosure.

What is claimed is:
1. A paper feeding roll for an electrophotographic apparatus, comprising:
an axial body; and
an elastic layer formed on an outer periphery of the axial body, wherein the paper feeding roll comprises a plurality of projections that form surface unevenness and are provided on a circumferential surface of the elastic layer, a position and a direction advanced in an opposite direction to a paper feeding direction are defined as a position and a direction preceding in the opposite direction to the paper feeding direction, each of the plurality of projections is shaped such that a position of a distal-end part preceding in the opposite direction to the paper feeding direction precedes, in the opposite direction to the paper feeding direction, a position of a base-end part preceding in the opposite direction to the paper feeding direction, each of the plurality of projections has a linear inclination that precedes in the opposite direction to the paper feeding direction from a base end to a distal end on a side that precedes in the opposite direction to the paper feeding direction, each of the plurality of projections has an inclination angle with respect to the opposite direction to the paper feeding direction, and the inclination angle is an obtuse angle, the inclination angle with respect to the opposite direction to the paper feeding direction is 95° to 140°, each of the plurality of projections is composed of an oblique prism or an oblique frustum having a distal-end side that precedes a base-end side in the opposite direction to the paper feeding direction, each of the plurality of projections has an upper base that has an area equal to or smaller than an area of a lower base, each of the plurality of projections has a height of 30 μm to 500 μm, the plurality of projections are regularly arranged on the circumferential surface of the elastic layer, and a volume resistivity of the elastic layer is in a range of $10^2$ to $10^{10}$ Ω·cm.

* * * * *